United States Patent [19]

Holloway et al.

[11] Patent Number: 5,772,177
[45] Date of Patent: Jun. 30, 1998

[54] VALVE LATCHING DEVICE FOR SINGLE HANDED OPERATION

[75] Inventors: David G. Holloway, Deefield; Kenneth Madden, Candia; Roger Massey, Portsmouth, all of N.H.

[73] Assignee: Parker & Harper Companies, Inc., Raymond, N.H.

[21] Appl. No.: 840,122

[22] Filed: Apr. 14, 1997

[51] Int. Cl.⁶ .................................................. F16K 35/00
[52] U.S. Cl. .............................. 251/95; 251/104; 251/110
[58] Field of Search .................................. 251/105, 110, 251/109, 103, 104, 106, 95, 288

[56] References Cited

U.S. PATENT DOCUMENTS

| | | | |
|---|---|---|---|
| 766,324 | 8/1904 | Faucet | 251/104 |
| 934,099 | 9/1909 | Sheafe | 251/104 |
| 2,239,831 | 4/1941 | Sadvary | 251/109 |
| 3,648,970 | 3/1972 | Hartmann et al. | 251/110 |
| 3,679,170 | 7/1972 | Bernas et al. | 251/104 |
| 4,078,763 | 3/1978 | Yamamoto | 251/96 |
| 4,909,275 | 3/1990 | Massey et al. | 251/104 |
| 5,188,335 | 2/1993 | Pettinaroli | 251/104 |
| 5,285,997 | 2/1994 | Chang | 251/110 |
| 5,647,389 | 7/1997 | Holloway | 251/95 |

Primary Examiner—Denise L. Ferensic
Assistant Examiner—Joanne Y. Kim
Attorney, Agent, or Firm—Davis and Bujold

[57] ABSTRACT

An improved latch mechanism for a fluid flow control valve. The latch mechanism having a latch body, a spring, a plunger and a thumb release lever for disengagement of the plunger. The latch mechanism is attached to a valve handle which controls the fluid flow rate through the valve. Provided with the latch, the handle and thereby the valve can be locked into either a closed or open position at the limits of the valves' necessary rotation thereby preventing inadvertent opening or closing of the valve. The thumb release lever disengages the plunger with detent notches provided in the valve body allowing safe and efficient single handed operation of the handle and latch mechanism even under adverse environmental conditions when operator dexterity is impaired by gloves.

5 Claims, 3 Drawing Sheets

VALVE LATCHING DEVICE FOR SINGLE HANDED OPERATION

FIELD OF THE INVENTION

The present invention relates generally to a latching device for a valve handle and particularly to a latching device equipped with a thumb release lever which permits the operator to release the latch using the same hand, which is concurrently grasping and turning the valve handle even when manual dexterity of the operator is impeded by a heavy glove or adverse environmental conditions.

BACKGROUND OF THE INVENTION

Manual valve specifications frequently include the stipulation that means be provided to prevent inadvertent operation of the valve. Often in the valve field this requirement is met by providing a handle which can be locked in position or a handle which can readily be removed from the valve when necessary for the valve position to remain fixed. Most commonly, quarter-turn valves fulfill this requirement by including a convenient detent latching feature that fixes the valve handle in the open and/or closed position. This latch, which must be disengaged prior to turning the handle, is released by lifting or sliding a spring loaded catch that automatically reengages at the handle travel limit(s).

Valves with these handle latches generally require both of the operator's hands to unlatch and operate. One hand is needed to disengage the latch while the other moves the handle. Since the latch operation usually requires manipulation of unwieldy small mechanical components, operation generally requires a certain degree of manual dexterity by the operator. In this case, it is often necessary for the operator to remove his/her protective gloves. When the valve is located in an area with limited access, for instance in a high temperature environment or in an area where chemical hazards are present, operator safety may be compromised.

SUMMARY OF THE INVENTION

Wherefore, it is an object of the present invention to overcome the aforementioned problems and drawbacks associated with the prior art designs of valve latching devices by providing easily manipulated, single handed control over the latching mechanism of quarter turn valves.

Another object of the invention is to enable the latching device to be installed as a complete assembly. The fulcrum about which the lever cantilevers or rotates, is integral with the latch body rather than being a separate part requiring an individual mounting.

According to the invention there is provided on the valve handle a latching mechanism comprising, a plunger; a spring means for resiliently biasing the plunger in the engaged position; a latch body defining a bore wherein the spring biased plunger extends coaxially within the bore and is substantially contained therein; a thumb release lever to move the plunger axially within the latch body whereby the plunger is disengaged from the engaged position allowing rotation of the valve handle.

Also according to the invention, there is provided a fluid flow control valve comprising a manually rotatable valve operating control handle, a latch biased to latch the valve handle in at least one desired position and a release lever manually operable to overcome the bias to release the latch thereby allowing the control handle to be rotated to adjust the valve, wherein the handle and lever are juxtaposed to permit simultaneous single handed manual operation of both.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
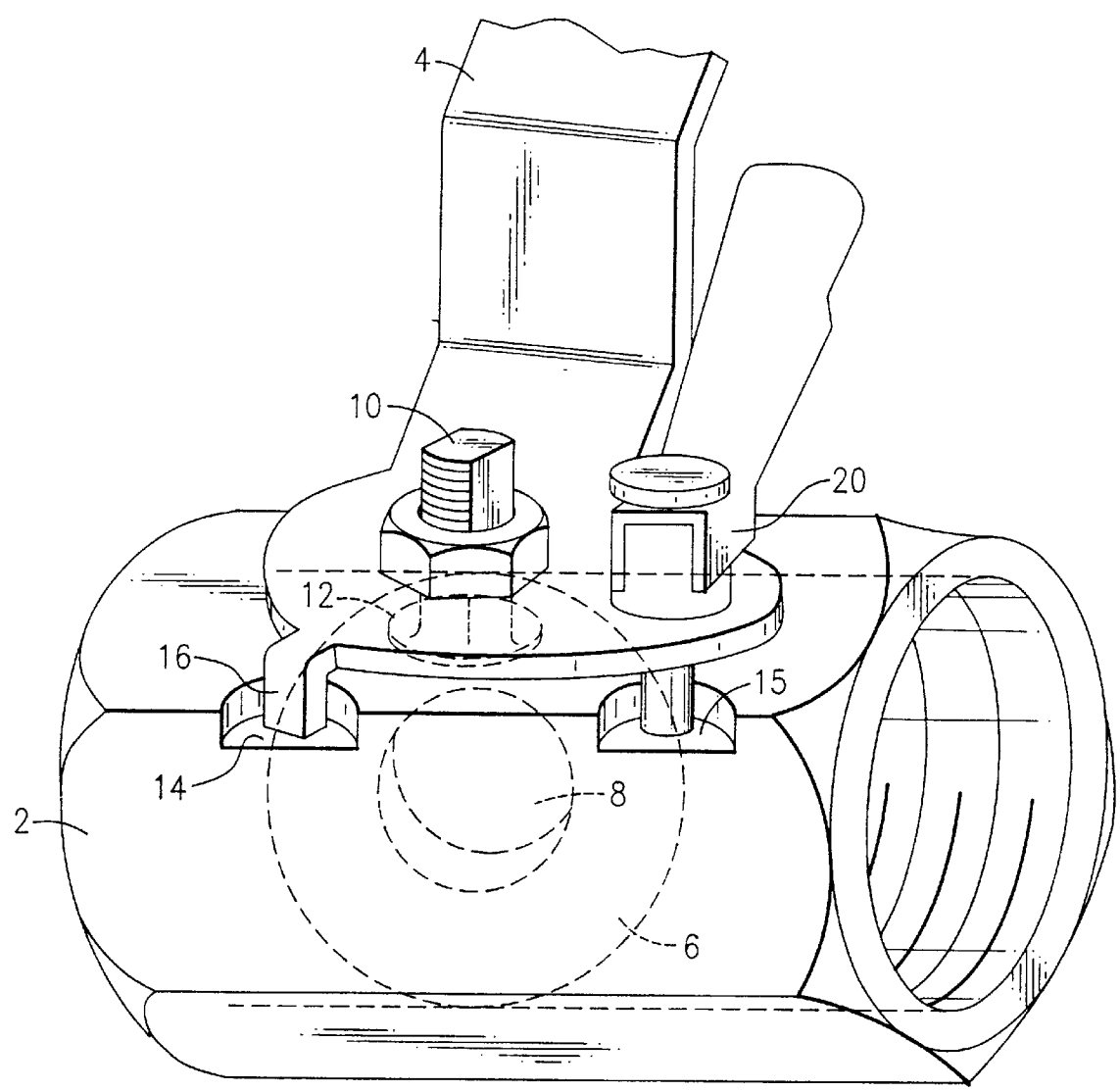
FIG. 1 indicates the valve body containing the ball and integral flow aperture as well as the handle with the latch mechanism installed and the plunger biased in the engaged position.

An embodiment of the invention as depicted in FIG. 1 of the drawings, discloses a conventional ball valve comprising a valve body 2 having an axial passageway, a rotatable ball 6 is contained within the valve body 2, the ball 6 having a flow aperture 8 such that when the ball is rotated and the flow aperture is axially aligned with the axial passageway fluid flow is permitted through the valve. The ball 6 also has an attached ball stem 10 which projects perpendicular to the axial passageway through an opening and sealing bushing in the valve body wall.

Also according to the invention a handle 4 is attached by any conventional means to the ball stem 10 and used to rotate the ball stem 10, the ball 6, and the flow aperture 8, within a 90 degree rotation such that the flow aperture 8 is either axially aligned with the valve body permitting unrestricted axial fluid flow (the open position) or as depicted in FIG. 1, concentrically rotated such that the flow aperture 8 is positioned perpendicular to the axial fluid flow thereby fully restricting axial fluid flow through the valve (the closed position). The handle 4 may also be positioned at any point within the 90 degree rotational limit to allow for a particular desired axial flow rate. The handle 4 is provided with a handle stop 16 which restricts the handle 4 to the 90 degree rotation by engaging respective detent notches 14 and 15 provided in the valve body 2.

Further according to the invention, a latching mechanism 20 is depicted generally in FIG. 1, and described in detail in FIGS. 2 and 2A, 3 and 4. The handle 4 supports a latch body 22 shown generally in FIG. 2 containing a spring means 28 for biasing a plunger 24 into the detent notch 15, and supports a thumb release lever 30 substantially adjacent to and parallel with the handle 4 for releasing the plunger 24 from the detent notch 15.

Figure 2:
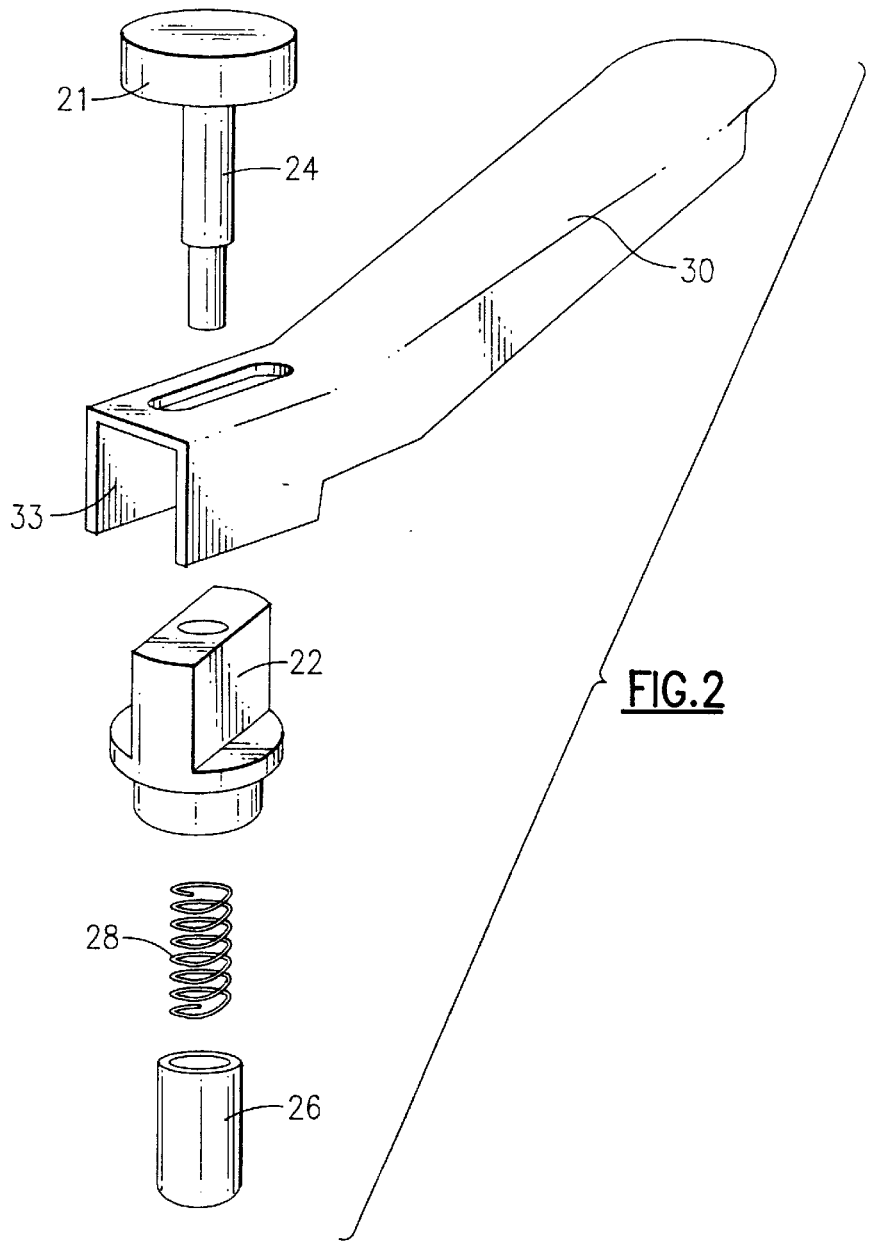
FIG. 2 is an exploded view of the individual components of the latching mechanism and includes a depiction of the disassembled plunger prior to swaging the lower engagement portion to the plunger.
Figure 2A:
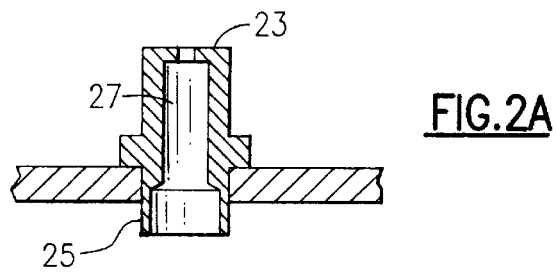
FIG. 2A is a cross sectional view of the latch body after installation in the handle but prior to swaging.

The latch body 22, depicted in detail in FIG. 2A has a top portion 23 and a base portion 25 which define the opposing ends of an axial bore 27 through the latch body. The latch body 22 supports the thumb release lever 30 and defines the relative motion of the plunger 24. The thumb release lever has a working end 33, slidably interposed between the plunger head 21 and the top portion 23 of the latch body, and a remote end 31 whereby the operation of latching mechanism 20 is initiated.

Figure 4:
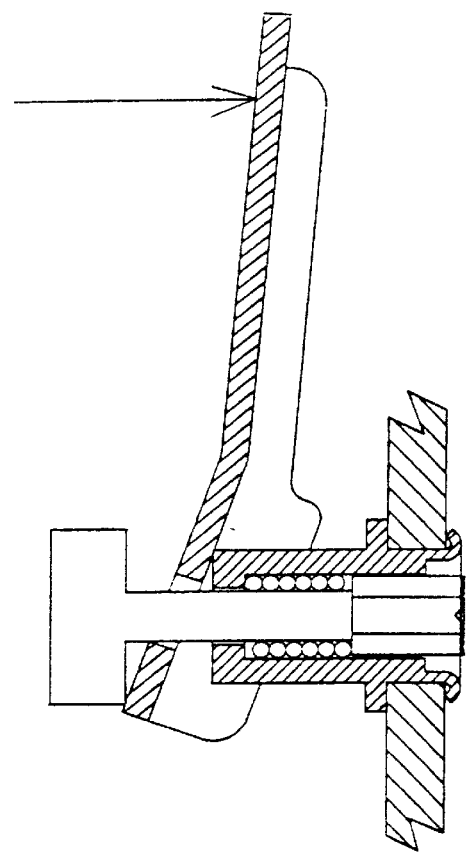
FIG. 4 is a cross sectional view of the latch mechanism installed and swaged to the valve handle with the plunger in the unbiased position due to a force being applied to the free end of the thumb release lever.
Figure 3:
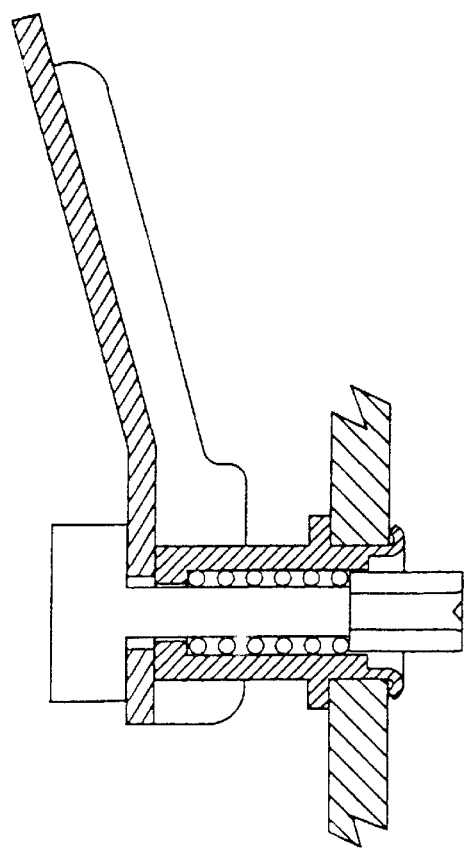
FIG. 3 is a cross sectional view of the latch mechanism installed and swaged to the valve handle with the plunger biased in the engaged position.

As seen in FIGS. 3 and 4, the top portion 23 acts as a fulcrum for the thumb release lever 4 when downward force is applied at the remote end of the thumb release lever and translated through a camming motion across the top portion 23 of the latch body forcing the working end 33 of the lever to extend upwards as shown in FIG. 3 thereby releasing the plunger and allowing free rotation of the handle 4.

It is also to be appreciated in the invention that the fulcrum about which the thumb release lever rotates does not necessarily have to be the top portion of the latch body. A mid-point or other camming mechanism at other points about the latch body or the handle may be provided which would exert the necessary upward force to move the plunger from the engaged position. It should also be recognized that the necessary force to move the plunger could be provided by similar means in that the thumb release lever could be toggled sideways and with the appropriate internal mechanisms, this action by the operator could also move the plunger from the engaged position.

A further feature of the latching device is that it may be installed as a completed assembly. The fulcrum about which the lever rotates is integral with the latch body rather than being a separate part requiring an individual mounting. The latch, completely assembled, may be inserted into a hole provided in the handle wherein the base portion 25 of the latch body is then swaged to the handle 4.

In operation, the valve handle 4 is in the closed position with the plunger 24 engaged in the detent notch 15. This holds the operating handle 4 in the locked position. The valve is operated by grasping the handle 4 depressing and holding the thumb release lever, while rotation of the handle in a clockwise manner opens the valve. The thumb release lever 30 may be released once handle rotation has begun. The latch plunger 24 will ride across the upper surface of the valve body and will not re-engage until handle 4 is returned to the closed position. A variation of this would provide another detent notch wherein the latch automatically would engage, not only at the closed position of the valve, but at the open position of the valve. This would be done by providing another detent notch on the respective portion of the valve body.

We claim:

1. A fluid flow control valve having a manually rotatable valve operating control handle, a latch biased to latch the valve handle in at least one desired position and a release lever manually operable to overcome the bias to release the latch thereby allowing the control handle to be rotated to adjust the valve, wherein the handle and lever are juxtaposed to permit simultaneous single handed manual operation of both the latch comprising:

a latch body having a top portion, a base portion and an axial bore;

a plunger having a head portion, and an engagement portion extending coaxially with and into the axial bore;

a spring means contained within the latch body biasing the plunger in a downwardly engaged position; and the lever being a thumb release lever slidably interposed between the top portion of the latch body and the plunger head portion such that operation of the thumb release lever overcomes the bias to move the plunger to a disengaged position.

2. A valve according to claim 1 in the form of a quarter turn ball valve.

3. A valve according to claim 1 wherein the top portion of the latch body acts as a fulcrum around which the thumb release lever is downwardly cantilevered to disengage the plunger from the engaged position and allowing rotation of the handle.

4. A valve according to claim 1 wherein the latch is attached to the handle.

5. A valve according to claim 1 wherein the lever extends generally parallel and adjacent to the handle thereby allowing an operator to simultaneously operate the handle and lever with one gloved hand.

* * * * *